(12) United States Patent
Lin et al.

(10) Patent No.: US 11,648,738 B2
(45) Date of Patent: May 16, 2023

(54) SYSTEMS AND METHODS OF AUTOMATED FILM REMOVAL

(71) Applicant: General Electric Company, Schenectady, NY (US)

(72) Inventors: Wendy Wenling Lin, Montgomery, OH (US); Alexander Joseph Vallee, Loveland, OH (US); Derek Black, Austin, TX (US); Stephen Grupinski, Austin, TX (US); Damain Hendrix, Austin, TX (US); Nathan Woodward, Austin, TX (US)

(73) Assignee: General Electric Company, Schenectady, NY (US)

( * ) Notice: Subject to any disclaimer, the term of this patent is extended or adjusted under 35 U.S.C. 154(b) by 314 days.

(21) Appl. No.: 16/598,583

(22) Filed: Oct. 10, 2019

(65) Prior Publication Data
US 2020/0148491 A1    May 14, 2020

Related U.S. Application Data

(60) Provisional application No. 62/745,823, filed on Oct. 15, 2018.

(51) Int. Cl.
*B32B 43/00* (2006.01)
*B29C 70/54* (2006.01)
(Continued)

(52) U.S. Cl.
CPC .......... *B29C 70/54* (2013.01); *B25J 15/0071* (2013.01); *B25J 15/0616* (2013.01); *B32B 38/10* (2013.01);
(Continued)

(58) Field of Classification Search
CPC . B32B 38/10; B32B 43/006; Y10T 156/1184; Y10T 156/1132; Y10T 156/1944; Y10T 156/1983
See application file for complete search history.

(56) References Cited

U.S. PATENT DOCUMENTS

| 3,449,889 A | 6/1969 | Molitor, Jr. |
| 3,640,562 A | 2/1972 | Creskoff |

(Continued)

FOREIGN PATENT DOCUMENTS

| CA | 2291927 A1 | 4/2001 |
| CN | 101386223 A | 3/2009 |

(Continued)

OTHER PUBLICATIONS

Translation of specification of Dunkmann et al. EP 2,926,956 (Year: 2015).*

(Continued)

*Primary Examiner* — Philip C Tucker
*Assistant Examiner* — Nickolas R Harm
(74) *Attorney, Agent, or Firm* — Dority & Manning, P.A.

(57) ABSTRACT

A system and method for separating a layer from a layer assembly when the layer assembly includes a backing layer and a material layer. The system includes an automated machine having a controller and an end effector. A separating tool is attached to the end effector of the automated machine. The separating tool includes a displacing member, with an outer face, configured to establish a void between the backing layer and the material layer by displacing a portion of the backing layer. The separating layer also
(Continued)

includes a securing member configured to establish a mechanical connection with a displaced portion of the backing layer.

12 Claims, 18 Drawing Sheets

(51) Int. Cl.
| | | |
|---|---|---|
| B65H 3/08 | (2006.01) | |
| B65H 3/22 | (2006.01) | |
| B25J 15/00 | (2006.01) | |
| B25J 15/06 | (2006.01) | |
| B32B 38/10 | (2006.01) | |
| B65H 3/14 | (2006.01) | |
| B65H 3/64 | (2006.01) | |

(52) U.S. Cl.
CPC ......... *B32B 43/006* (2013.01); *B65H 3/0816* (2013.01); *B65H 3/0883* (2013.01); *B65H 3/22* (2013.01); *B65H 3/0891* (2013.01); *B65H 3/14* (2013.01); *B65H 3/64* (2013.01); *Y10T 156/1132* (2015.01); *Y10T 156/1184* (2015.01); *Y10T 156/1944* (2015.01); *Y10T 156/1983* (2015.01)

(56) References Cited

U.S. PATENT DOCUMENTS

| | | | |
|---|---|---|---|
| 3,833,251 | A | 9/1974 | Creskoff |
| 3,856,294 | A | 12/1974 | Lutts et al. |
| 4,034,054 | A | 7/1977 | Sauer |
| 4,299,533 | A | 11/1981 | Ohnaka |
| 4,368,913 | A | 1/1983 | Brockmann et al. |
| 4,407,625 | A | 10/1983 | Shum |
| 4,579,329 | A | 4/1986 | Frost et al. |
| 4,722,256 | A | 2/1988 | Kuehnert |
| 4,784,422 | A | 11/1988 | Jones et al. |
| 4,806,070 | A | 2/1989 | Poux et al. |
| 4,931,341 | A | 6/1990 | Haffer et al. |
| 5,024,575 | A | 6/1991 | Anderson |
| 5,037,599 | A | 8/1991 | Olson |
| 5,149,391 | A | 9/1992 | Li et al. |
| 5,173,314 | A | 12/1992 | Hosoi |
| 5,183,670 | A | 2/1993 | Trudeau |
| 5,290,386 | A | 3/1994 | Trudeau |
| 5,397,415 | A | 3/1995 | Manabe et al. |
| 5,427,518 | A | 6/1995 | Morizot et al. |
| 5,648,109 | A | 7/1997 | Gutowski et al. |
| 5,704,673 | A | 1/1998 | Reckart |
| 5,879,040 | A | 3/1999 | Nagai et al. |
| 5,885,052 | A | 3/1999 | Tsuji et al. |
| 6,017,484 | A | 1/2000 | Hale |
| 6,129,031 | A | 10/2000 | Sarh et al. |
| 6,131,973 | A | 10/2000 | Trudeau et al. |
| 6,146,576 | A | 11/2000 | Blackmore |
| 6,484,776 | B1 | 11/2002 | Meilunas et al. |
| 6,641,131 | B2 | 11/2003 | Stohr et al. |
| 6,893,070 | B2 | 5/2005 | Baker |
| 6,896,513 | B2 | 5/2005 | Bachrach et al. |
| 7,351,304 | B2 | 4/2008 | Liang et al. |
| 7,588,711 | B2 | 9/2009 | Depase et al. |
| 7,611,180 | B1 | 11/2009 | Fisher et al. |
| 7,758,786 | B2 | 7/2010 | Nemchick et al. |
| 7,785,433 | B2 | 8/2010 | Kisch et al. |
| 7,905,977 | B2 | 3/2011 | Qi et al. |
| 7,950,708 | B2 | 5/2011 | Parnell |
| 8,016,008 | B2 | 9/2011 | Pfitzner et al. |
| 8,029,642 | B2 | 10/2011 | Hagman |
| 8,048,261 | B2 | 11/2011 | McCowin |
| 8,142,181 | B2 | 3/2012 | Willden et al. |
| 8,162,652 | B2 | 4/2012 | Marengo et al. |
| 8,231,125 | B2 | 7/2012 | Hendle et al. |
| 8,256,484 | B2 | 9/2012 | Kisch et al. |
| 8,256,485 | B2 | 9/2012 | Tillement et al. |
| 8,303,761 | B2 | 11/2012 | Inserra Imparato et al. |
| 8,328,940 | B2 | 12/2012 | Choi et al. |
| 8,349,129 | B2 | 1/2013 | Blanchard et al. |
| 8,424,580 | B2 | 4/2013 | Anderson et al. |
| 8,464,773 | B2 | 6/2013 | Hagman |
| 8,528,618 | B2 | 9/2013 | Kisch et al. |
| 8,551,291 | B2 | 10/2013 | George |
| 8,551,380 | B2 | 10/2013 | Hawkins et al. |
| 8,555,760 | B2 | 10/2013 | Heidlmayer et al. |
| 8,567,470 | B2 | 10/2013 | Kron et al. |
| 8,574,388 | B2 | 11/2013 | Colombo et al. |
| 8,585,952 | B2 | 11/2013 | Packer et al. |
| 8,628,709 | B2 | 1/2014 | Blot et al. |
| 8,826,957 | B2 | 9/2014 | Shair et al. |
| 8,900,391 | B2 | 12/2014 | Silcock et al. |
| 8,936,289 | B1 | 1/2015 | Kozlowski et al. |
| 8,992,727 | B2 | 3/2015 | Laghi |
| 9,334,066 | B2 | 5/2016 | Tapia et al. |
| 9,358,770 | B2 | 6/2016 | Dong et al. |
| 9,586,390 | B2 | 3/2017 | Hou et al. |
| 10,160,169 | B1 | 12/2018 | Lutz et al. |
| 10,195,747 | B1 | 2/2019 | Nieratschker et al. |
| 2004/0053184 | A1 | 3/2004 | Bachrach et al. |
| 2004/0109751 | A1 | 6/2004 | Whitcomb et al. |
| 2008/0089772 | A1 | 4/2008 | Mueller-Hummel |
| 2008/0171435 | A1 | 7/2008 | Fujii et al. |
| 2008/0202420 | A1 | 8/2008 | Smith et al. |
| 2008/0202892 | A1 | 8/2008 | Smith et al. |
| 2008/0206022 | A1 | 8/2008 | Smith et al. |
| 2009/0084493 | A1 | 4/2009 | Westerdahl et al. |
| 2009/0133524 | A1 | 5/2009 | Fukano et al. |
| 2009/0226310 | A1 | 9/2009 | Finn et al. |
| 2010/0224320 | A1 | 9/2010 | Tsai et al. |
| 2011/0259515 | A1 | 10/2011 | Rotter et al. |
| 2012/0004774 | A1 | 1/2012 | Umetsu |
| 2012/0138218 | A1 | 6/2012 | Dean et al. |
| 2012/0330453 | A1 | 12/2012 | Samak Sangari et al. |
| 2013/0011269 | A1 | 1/2013 | Gainnozzi et al. |
| 2013/0323473 | A1 | 12/2013 | Dietsch et al. |
| 2013/0341816 | A1 | 12/2013 | Bergmann |
| 2014/0029926 | A1 | 1/2014 | Costanzo et al. |
| 2014/0090528 | A1 | 4/2014 | Graf |
| 2014/0238617 | A1 | 8/2014 | Shair et al. |
| 2015/0246522 | A1 | 9/2015 | Nelson et al. |
| 2015/0258729 | A1 | 9/2015 | Wolfe et al. |
| 2015/0314584 | A1 | 11/2015 | Dong et al. |
| 2015/0328844 | A1 | 11/2015 | Murakami et al. |
| 2016/0005638 | A1 | 1/2016 | Agarwal et al. |
| 2016/0222798 | A1 | 8/2016 | Snyder et al. |
| 2016/0266573 | A1 | 9/2016 | Bheda et al. |
| 2017/0151731 | A1 | 6/2017 | Ho Yew Chi et al. |
| 2017/0341278 | A1 | 11/2017 | Shair et al. |
| 2017/0341310 | A1 | 11/2017 | Thattai Parthasarathy et al. |
| 2018/0178990 | A1 | 6/2018 | Filipovic et al. |
| 2018/0178991 | A1 | 6/2018 | Filipovic et al. |
| 2018/0297298 | A1 | 10/2018 | Marquez |

FOREIGN PATENT DOCUMENTS

| | | |
|---|---|---|
| CN | 101489768 A | 7/2009 |
| CN | 101835583 A | 9/2010 |
| CN | 103341470 A | 10/2013 |
| CN | 104441697 A | 3/2015 |
| CN | 104802175 A | 7/2015 |
| CN | 104875211 A | 9/2015 |
| CN | 105110061 A | 12/2015 |
| CN | 204917410 U | 12/2015 |
| DE | 4035004 A1 | 5/1992 |
| DE | 20308945 U1 | 11/2003 |
| EP | 0369507 B1 | 5/1993 |
| EP | 0659541 B1 | 4/1998 |
| EP | 0419461 B1 | 9/1998 |
| EP | 1099538 B1 | 12/2004 |
| EP | 2474410 A1 | 7/2012 |
| EP | 2334486 B1 | 12/2012 |
| EP | 2561978 A2 | 2/2013 |
| EP | 2536552 B1 | 5/2014 |
| EP | 2926956 A1 | 10/2015 |

(56) References Cited

FOREIGN PATENT DOCUMENTS

| | | |
|---|---|---|
| EP | 3067182 A1 | 9/2016 |
| FR | 2689809 A1 | 10/1993 |
| JP | S63144037 A | 6/1988 |
| JP | S63288721 A | 11/1988 |
| JP | H11233457 A | 8/1999 |
| JP | 2002120186 A | 4/2002 |
| JP | 2006255801 A | 9/2006 |
| JP | 2010123903 A | 6/2010 |
| JP | 4519824 B2 | 8/2010 |
| JP | 2012101864 A | 5/2012 |
| JP | 5250086 B2 | 7/2013 |
| JP | 2013258222 A | 12/2013 |
| JP | 2014229773 A | 12/2014 |
| JP | 2015204383 A | 11/2015 |
| KR | 100751495 B1 | 8/2007 |
| KR | 100754880 B1 | 8/2007 |
| KR | 100812470 B1 | 3/2008 |
| KR | 100876950 B1 | 1/2009 |
| KR | 100935537 B1 | 1/2010 |
| KR | 100987362 B1 | 10/2010 |
| KR | 101368898 B1 | 3/2014 |
| WO | WO 9605386 A1 | 2/1996 |
| WO | WO2009/044194 A2 | 4/2009 |
| WO | WO2015/145407 A1 | 10/2015 |

OTHER PUBLICATIONS

Bjornsson et al., Automated Removal of Prepreg Backing Paper—A Sticky Problem, SAE Technical Paper Published Sep. 17, 2013, 9 pages.
Clerico, Materials Forming Technologies of Thermoplastic Matrix Composites, Interplastics, vol. 16, No. 3, May-Jun. 1993, pp. 76-86.
International Search Report Corresponding to Application No. PCT/US2019/055571 dated Jan. 22, 2020.
Schmalz, Video, Needle Gripper SNG-M for Handling Composite Textiles and Preforms http://video.schmalz.com/en/automated-handling/automotive/video/schmalz-needle-gripper-sng-m-for-handling-composite-textiles-and-preforms/134-1.html?no_cache=1 (Video Abstract).
Schmalz, Video, Special Gripper SCG for Handling and Separating Carbon Composites http://video.schmalz.com/en/automated-handling/automotive/video/vacuum-special-coanda-gripper-for-handling-and-separating-carbor-composites/084-1.html?no_cache-1 (Video Abstract).
Smiley et al., Analysis of the Diaphragm Forming of Continuous Fiber Reinforced Thermoplastics, Journal of Thermoplastic Composite Materials, vol. 1, Issue 4, Oct. 1988, pp. 298-321.

\* cited by examiner

SYSTEMS AND METHODS OF AUTOMATED FILM REMOVAL

PRIORITY INFORMATION

The present application claims priority to U.S. Provisional Patent Application Ser. No. 62/745,823 filed on Oct. 15, 2018, which is incorporated by reference herein.

FIELD OF TECHNOLOGY

The present disclosure relates generally to automated manufacturing and, more specifically, to systems and methods of removing various protective films during composite layups or other processes.

BACKGROUND

Composite laminate components generally include a plurality of layers or plies of composite material assembled together to provide the composite component with improved engineering properties. Composite components are typically manufactured by stacking a plurality of plies on top of each other until a desired thickness and shape is achieved. For example, the manufacturing process typically includes cutting plies of composite material to a desired shape, stacking the plies layer by layer, and compacting the plies after each additional ply is layered over the previously stacked plies. The plies of composite material may be produced with a pre-impregnated resin covered by a removable polyfilm extending over at least one side of the plies, and that facilitates handling of the material prior to layup. During manufacture of composite components, the polyfilm is removed from the plies of composite material before a subsequent ply is stacked on top of the previously layered ply.

Conventionally, removing the backing layer(s) from the composite layer is a manual process performed by an individual. Thus, manually separating and removing the backing layer(s) from the composite layer relies on the skill of the individual to ensure that the backing layer is removed properly and swiftly. Further, sharp objects often are used in the manual process for releasing the backing layer and subsequently removing the backing layer from the composite layer. As such, manually releasing and removing the backing layer(s) is tedious and may cause damage to the composite material; further, manual processes may not be time and/or cost efficient for loosening and/or removing the backing layer(s) from the composite layer. Additionally, the manual processes of releasing and removing the backing layer(s) may lack repeatability and reliability. In short, removal of the polyfilm after each ply has been stacked can be a time-consuming and laborious task and automated efforts have, to date, failed to accomplish the removal of the entire polyfilm with an acceptable level of consistency.

In addition to the manufacture of composite components, myriad other manufacturing processes exist where a polyfilm must be removed either during the process or at its conclusion. An automated system capable of reliably removing the polyfilm is desirable.

BRIEF DESCRIPTION

Aspects and advantages will be set forth in part in the following description, or may be obvious from the description, or may be learned through practice of the invention.

In accordance with one embodiment of the present disclosure, a system for separating a layer from a layer assembly is provided. The layer assembly includes a backing layer and a material layer. The system includes an automated machine having a controller and an end effector. A separating tool is attached to the end effector of the automated machine. The separating tool includes a displacing member, with an outer face, configured to establish a void between the backing layer and the material layer by displacing a portion of the backing layer. The separating layer also includes a securing member configured to establish a mechanical connection with a displaced portion of the backing layer.

In accordance with another embodiment of the present disclosure, a method for separating a layer from a layer assembly is provided. The method includes placing a portion of a layer assembly on an assembly surface that holds the portion in place. The layer assembly includes a backing layer and a material layer. A separating tool attached to a machine is brought into contact with a surface portion of the backing layer. The separating tool is activated so as to create a void between the backing layer and material layer, resulting in a displaced portion of the backing layer. A mechanical connection is established with the displaced portion of the backing layer and the separating tool is moved in a selected direction to remove the secured backing layer and expose the entirely of the material layer.

In accordance with another embodiment of the present disclosure, a method for enabling the automated layup of a composite laminate assembly is provided. The method includes applying a portion of a resin on an assembly surface, the resin being of the same type as that pre-impregnated into a first composite ply. A first uncovered surface defined by a face of the first composite ply is positioned in contact with the portion of resin on the assembly surface and with a backing layer facing away from the assembly surface. An automated system with a separating tool is employed to separate the backing layer from the first composite ply and dispose of the backing layer. A second composite ply is placed upon the first composite ply orientated so that an uncovered surface of the second composite ply is in contact with the second uncovered surface of the first composite ply. An automated system with a separating tool is again employed to separate the backing layer from the second composite ply and dispose of the backing layer.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

Figure 1:
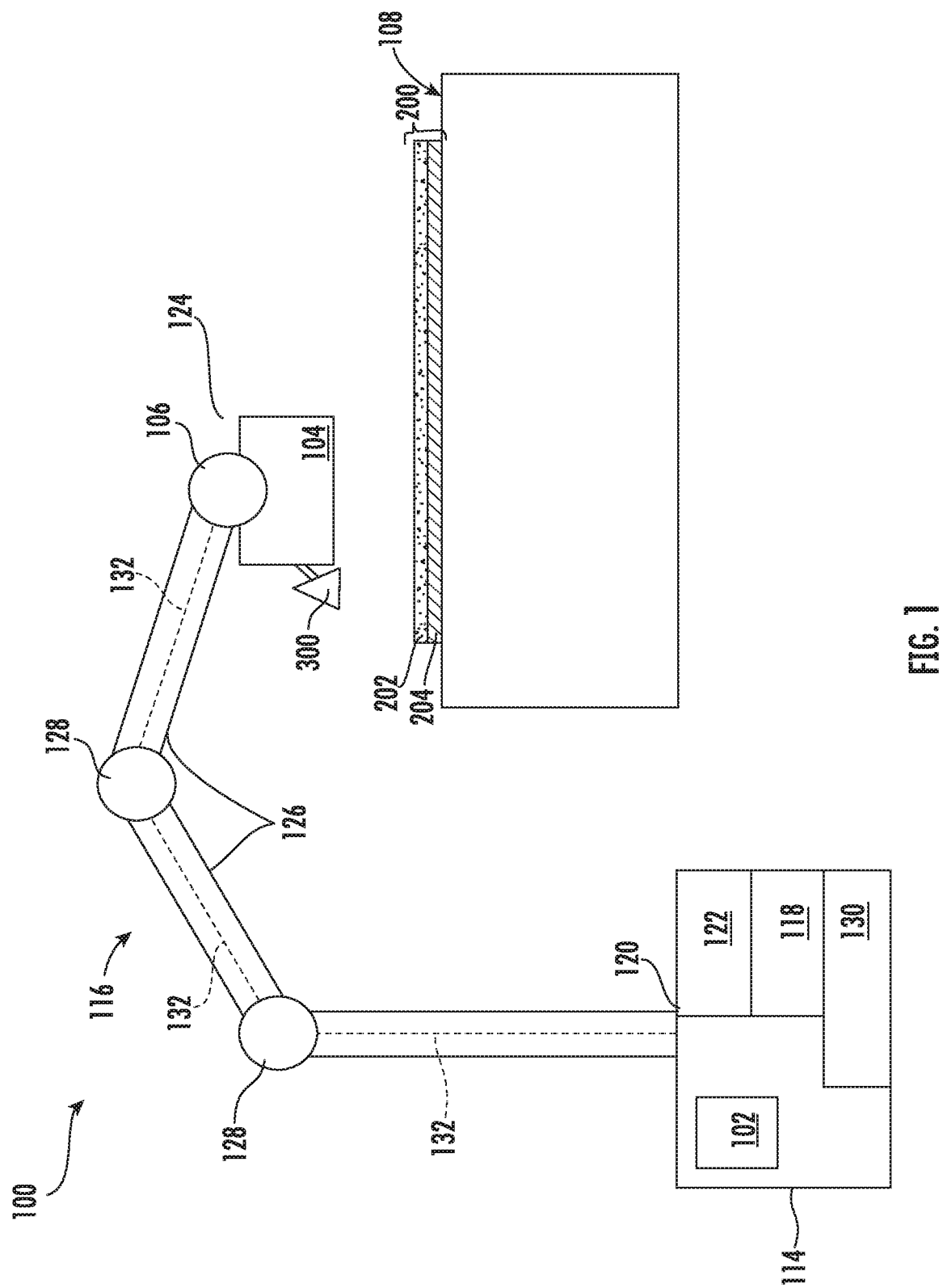
FIG. 1 shows an exemplary automated system for separating a layer from a layer assembly.

Repeat use of reference characters in the present specification and drawings is intended to represent the same or analogous features or elements of the present invention.

DETAILED DESCRIPTION OF PARTICULAR EMBODIMENTS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

In the present disclosure, when a layer is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

As used herein, the term "polyfilm" generally includes a film made from, but not limited to, homopolymers; copolymers, such as, for example, block, graft, random and alternating copolymers; and terpolymers; and blends and modifications thereof. Furthermore, unless otherwise specifically limited, the term "polyfilm" shall include all possible geometrical polymer configurations. These configurations include, but are not limited to isotactic, syndiotactic, and random symmetries.

In one aspect, a layup system for use in forming a composite layup structure from a plurality of plies of composite material, including an outermost ply of composite material with a backing layer adhered thereto, is provided. The system includes a robotic device and an end effector coupled to the robotic device. The end effector includes a separating tool designed to remove the backing layer by developing a void between the composite layer and the backing layer and a means to mechanically secure the backing layer. The robotic device is configured to translate the effector relative to the composite layup structure such that the backing layer is peeled from the outermost ply of composite material.

Referring now to the drawings, FIG. 1, is a simplified drawing of one embodiment of the present disclosure. In this embodiment, an automated machine 100 is connected to a controller 102 and has an end effector 104 affixed to a movable component 106. A separating tool 300 is affixed to the end effector 104. The moveable component 106 is configured to place the end effector 104 into a selected position to perform a desired function upon a layer stack 200 positioned by a first work support 108.

Referring again to FIG. 1, the end effector 104 may be a device for lifting a portion of the layer stack 200, a cutting device designed to separate a portion of the layer stack 200, or any other implement designed to interact with the layer stack 200. For example, in an embodiment designed for lifting a portion of the layer stack 200, the end effector 104 may be an impactive gripper, such as a mechanical or pneumatic gripper; an ingressive gripper, such as a needle or pin gripper; an astrictive gripper, such as a vacuum, magnetic, or electro-adhesive gripper; a contigutive gripper, such as a glue or freezing gripper, or any combination thereof. Likewise, in an embodiment designed to separate a portion of the layer stack 200, an exemplary end effector 104 may be an ultrasonic cutter, a blade cutter, a bit cutter, a laser cutter, a plasma cutter, a wire cutter, or a waterjet cutter. In still other exemplary embodiments, the end effector 104 may include a drill, a deburring tool, a welder, a sprayer, a stamp, or a driver. In still other embodiments, the end effector 104 may be a device with multiple tools or grippers designed to accomplish a specified operation.

Figure 15:
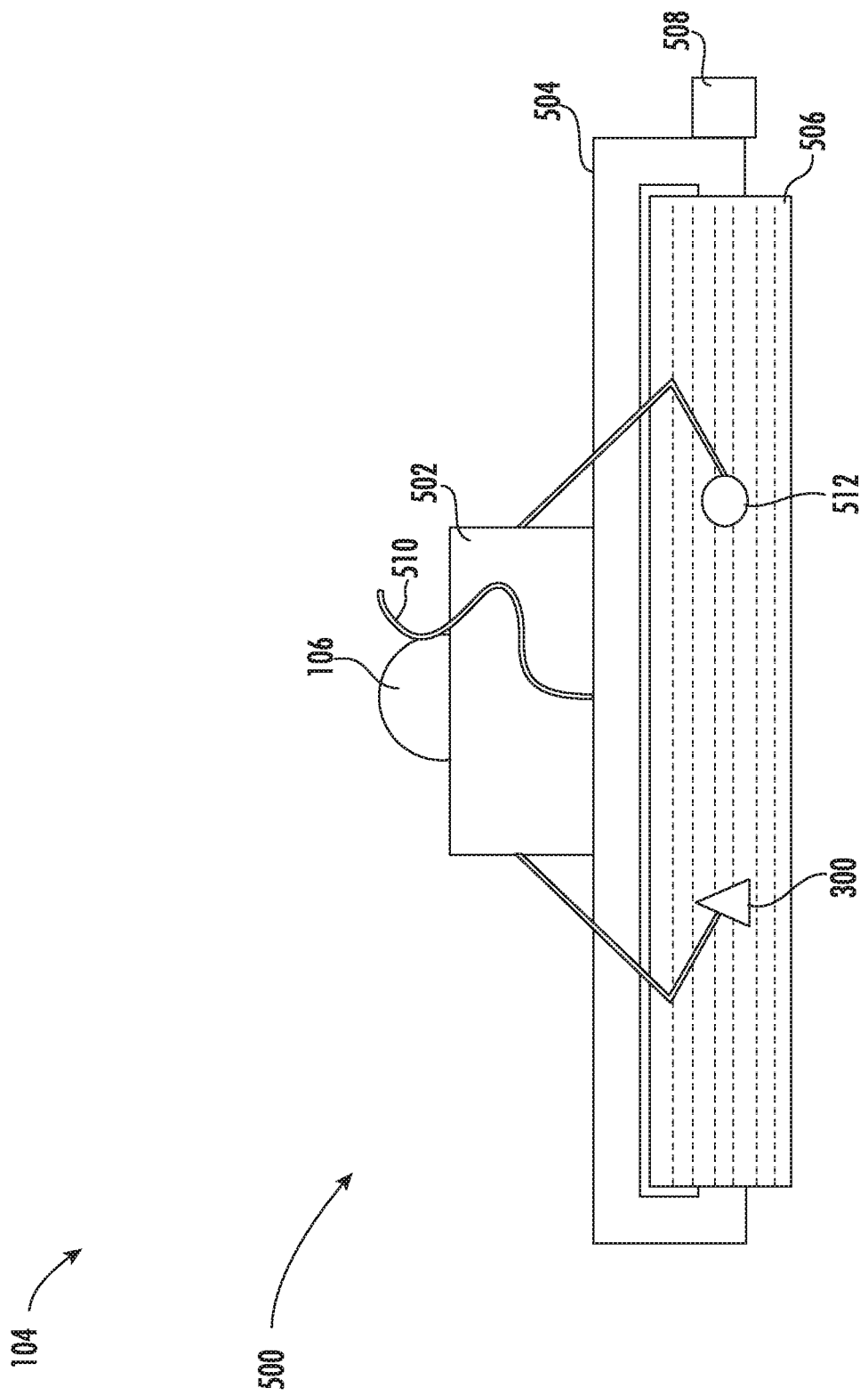
FIG. 15 shows an exemplary end effector configured as a vacuum roller such as for use in the exemplary systems of FIGS. 1-4.

Referring still to the end effector 104 of FIG. 1, and to FIG. 15, an embodiment of the end effector 104 is depicted which shows the end effector 104 configured as a vacuum roller 500 enabled to lift a portion of the layer stack 200. In this exemplary embodiment, the vacuum roller 500 is attached to moveable component 106 via an attachment structure 502. A support arm 504 is secured to the attachment structure 502 and mounts a perforated drum 506. Power, vacuum, and commands are delivered to the vacuum roller 500 by cables and hoses 510. The perforated drum is rotated at the command of the controller 102 (not shown) by a servo motor 508. Positioning and functioning input is provided to the controller from affixed sensors 512. The separating tool 300 is coupled to the vacuum roller 500 in a selected location able to be brought into contact with the layer stack 200 (not shown).

The layer stack 200 of FIG. 1 includes a backer layer 202 and a material layer 204. In one embodiment, the backer layer 202 generally refers to a removable polyfilm but may also include other removable materials; for example, release paper, waxed paper, peel-able coating systems, and masking tapes. The material layer 204 refers to a material being used in the production of an end item or the end item itself. For example, in some instances the material layer 204 may be a pre-impregnated composite ply. In still other instances, the material layer 204 may be, but is not limited to, a metal object, glass plate, or a digital display.

Figure 2:
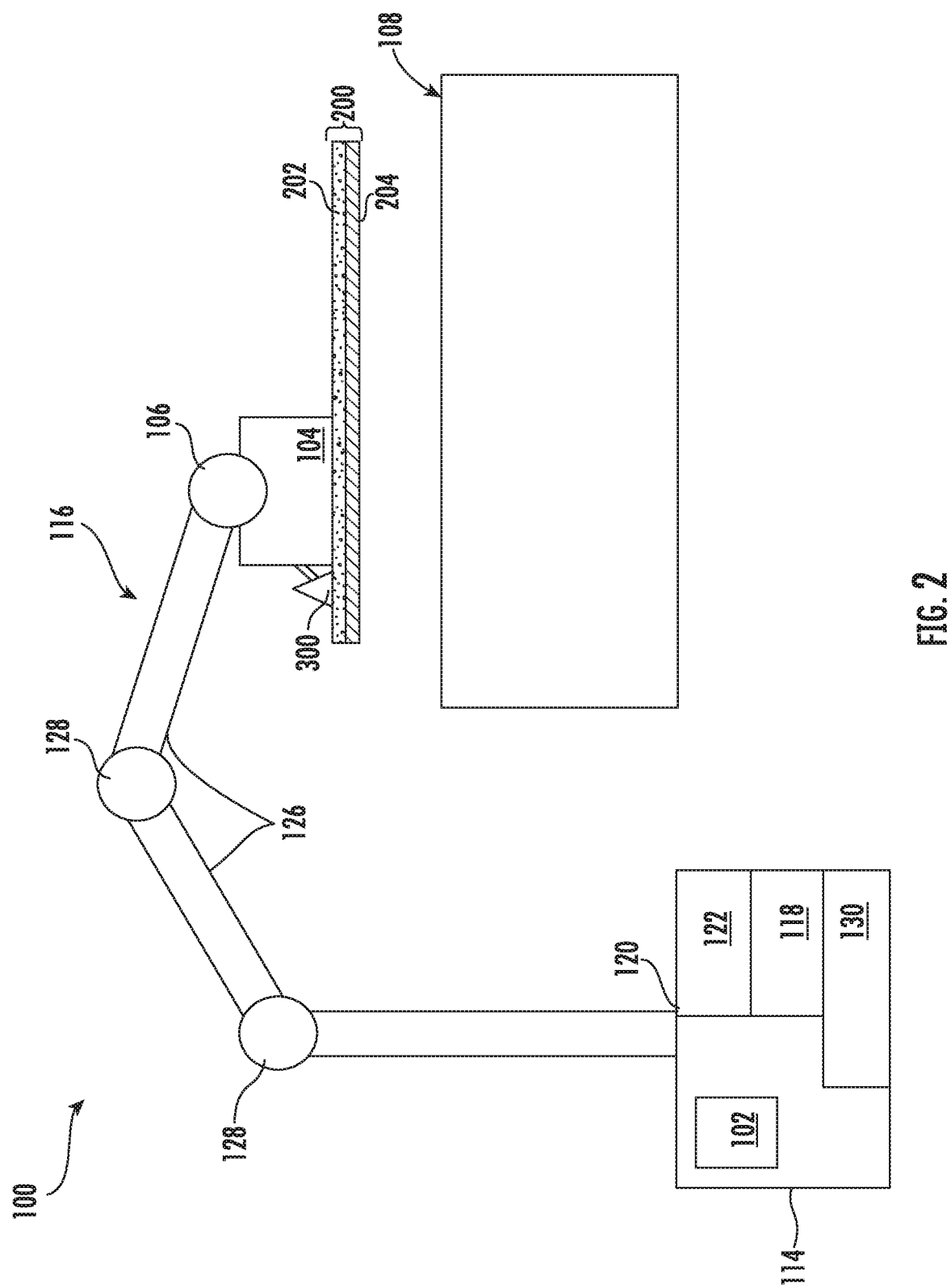
FIG. 2 shows the exemplary automated system of FIG. 1 for separating a layer from a layer assembly in contact with the layer assembly.
Figure 3:
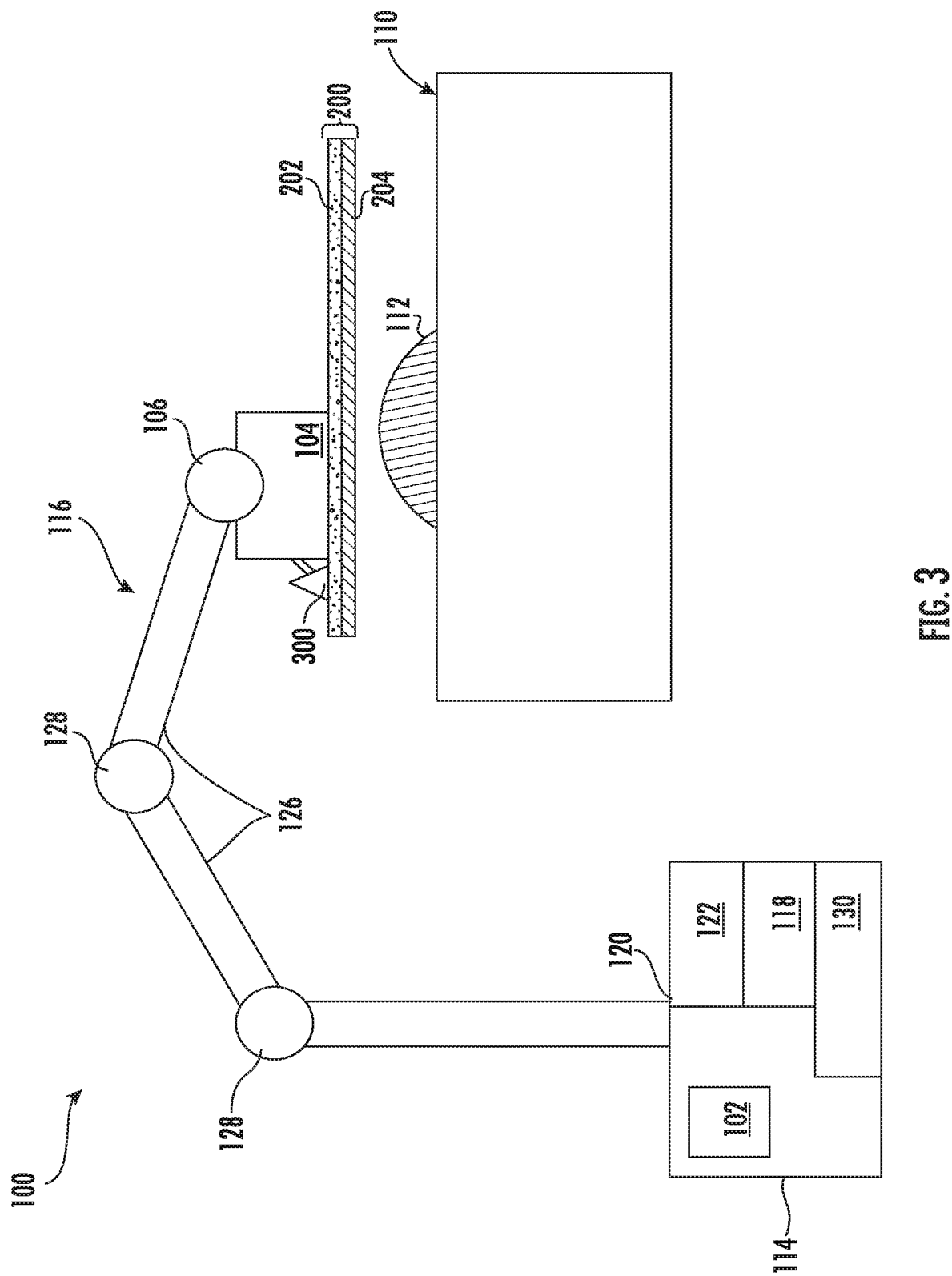
FIG. 3 shows the exemplary automated system FIG. 1 for separating a layer from a layer assembly in position over an assembly surface.

FIG. 1-4 depict a sequential operation of an exemplary embodiment of the present disclosure. The exemplary operation depicted relates to the forming of a composite layup structure from a plurality of plies of pre-impregnated composite material. In the exemplary operation, a desired portion pre-impregnated composite material, represented by the layer stack 200, has been separated from a stock of pre-impregnated composite material (not depicted) and FIG. 1 shows the end effector 104 in position over the layer stack 200. In this instance, the end effector 104 is configured to be a device for lifting a portion of the layer stack 200, such as the vacuum roller as depicted in FIG. 15. FIG. 2 shows the automated machine 100 after the end effector 104 has captured a portion of the layer stack 200 and the automated machine 100 has lifted the portion from the first work support 108. Between FIG. 2 and FIG. 3, the automated machine proceeds from the first work support 108 to a second work support 110. FIG. 3 depicts the end effector 104 holding a portion of the layer stack 200 over an assembly surface 112 supported by the second work support 110.

In the present instance, the assembly surface 112 depicts, but is not limited to, a male mold designed to shape the material layer 204 into the desired shape of the component being produced. In addition to the male mold depicted, the assembly surface 112 may also be a planar surface or a female mold. In some embodiments, the assembly surface 112 is treated with a compatible resin so as to create a securing substrate for holding a first ply of the material layer 204. For instances in which the material layer 204 is pre-impregnated composite material, the compatible resin may be the same as the resin pre-impregnating the composite fibers so as to eliminate the introduction of additional adhesive elements. In some instances, the assembly surface may be externally or internally heated. In still other instances, the material layer 204 may be held by the assembly surface 112 through the creation of a vacuum or magnetic field at the assembly surface 112.

Figure 4:
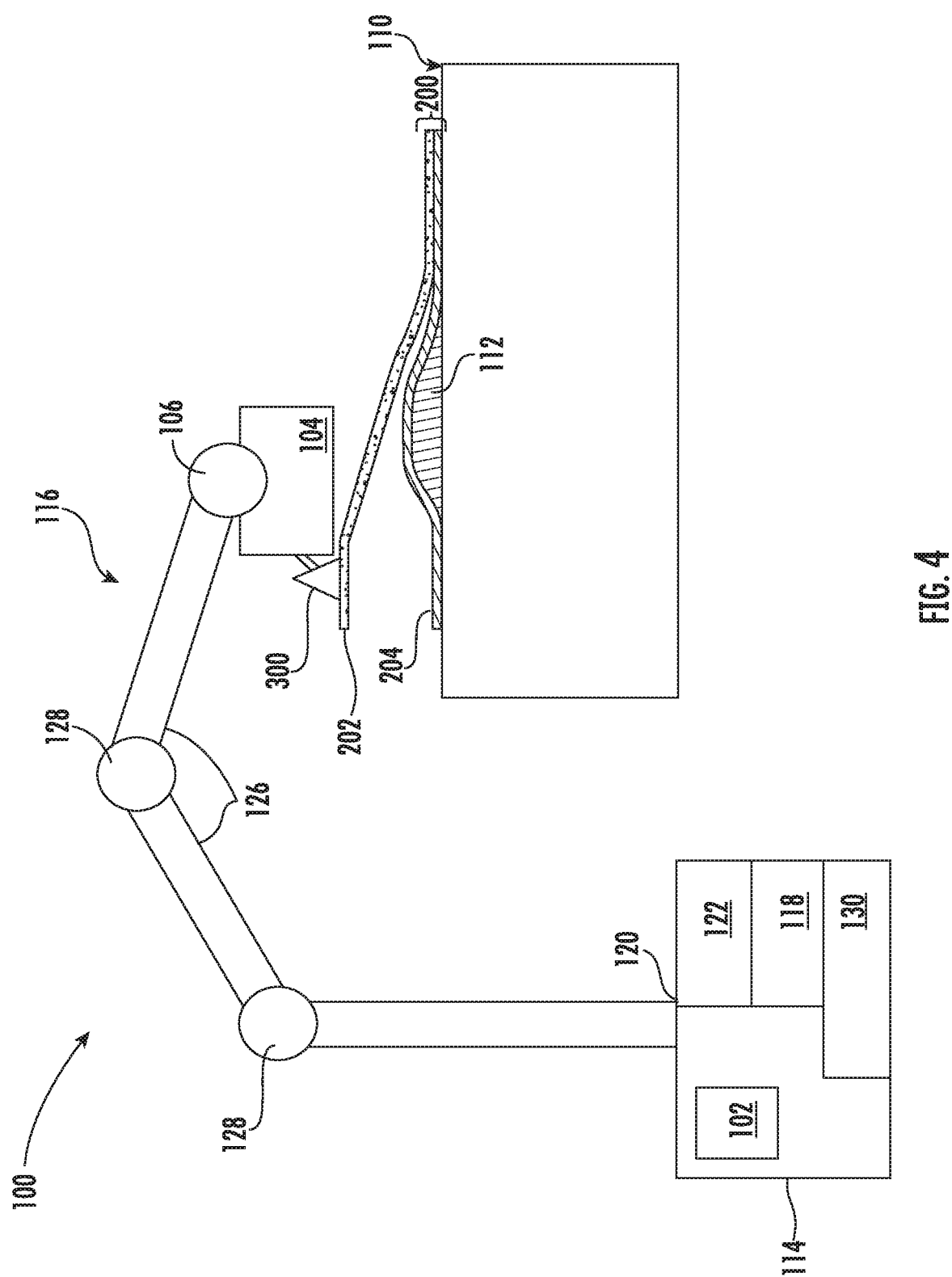
FIG. 4 shows the exemplary automated system FIG. 3 removing a backing layer.

In FIG. 4, the layer stack 200 has been positioned on the assembly surface 112, the separating tool 300 has captured the backing layer 202 and the automated machine 100 is separating the backing layer 202 from the material layer 204.

Figure 5:
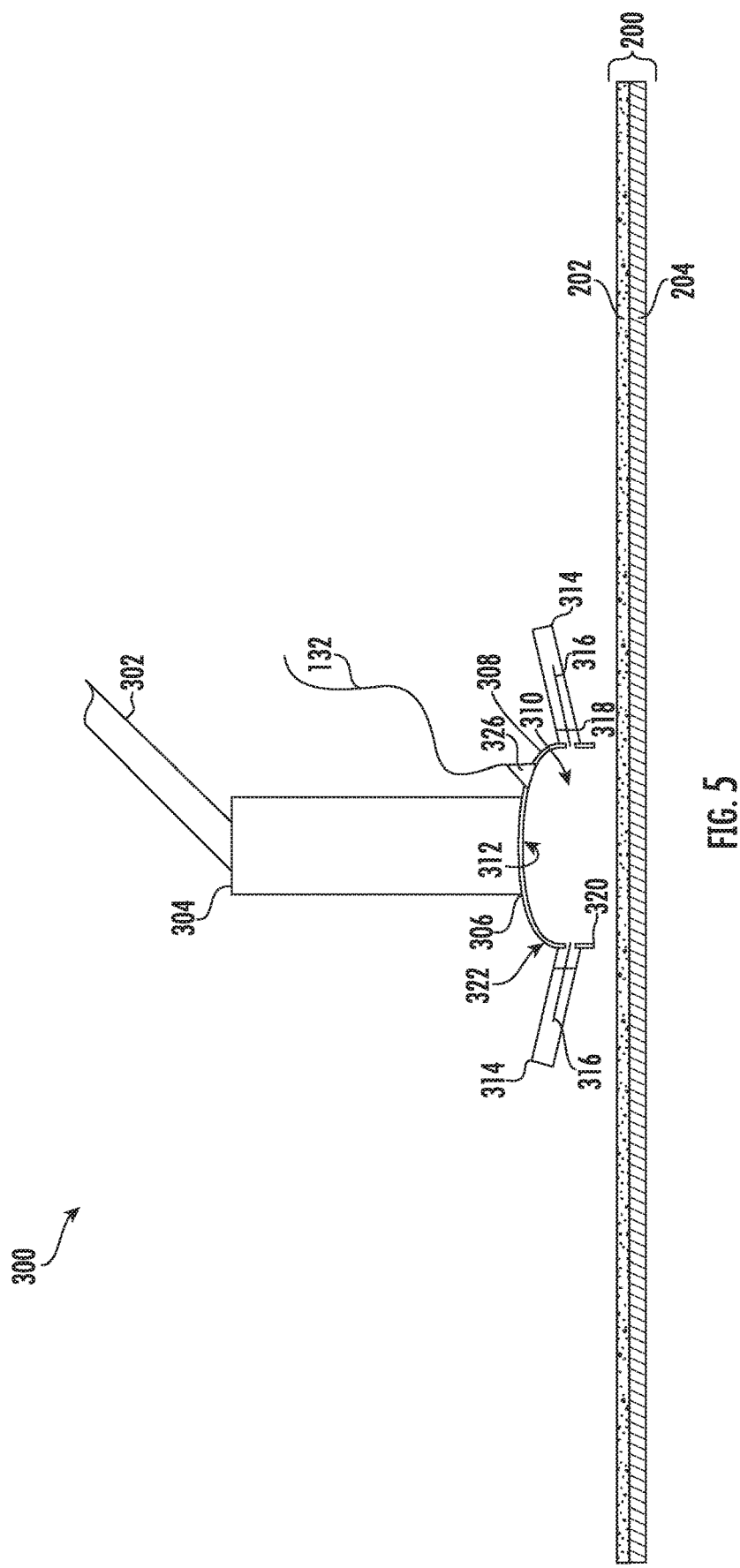
FIG. 5 shows a cross-section view of an exemplary separating tool such as for use in the exemplary systems of FIGS. 1-4.

Referring now to FIG. 5, a close-up, cross-sectional view is provided of an embodiment of the separating tool 300. The separating tool 300 is coupled to the end effector 104 via an attachment structure 302, which in turn, is coupled to a support column 304. A support column first end 306 is coupled to a displacing member 308. The displacing member 308 is formed so as to enable the establishment of a void between the backing layer 202 and the material layer 204. In the depicted embodiment of FIG. 5, the displacement of the backing layer 202 occurs in response to the creation of a vacuum in a void 310 between an inner face 312 of the displacing member 308 and the backing layer 202 when a mating face 320 is in contact with the backing layer 202 and a vacuum is drawn through an attached vacuum coupling 326, which is operably coupled to a support structures 130 via a vacuum line 132. The depth D of the void 310 is selected so as to enable the mechanical securing of a displaced portion (FIG. 6; 206) of the backing layer 202. In some embodiments, it may be desirable to ensure a sufficient portion of the backing layer 202 is displaced to enable mechanical securing without the securing mechanism penetrating the material layer 204.

Referring still to FIG. 5, at least one actuator 314 is coupled to an outer face 322 of the displacing member 308. The actuator 314 is configured to, when directed by controller 102, drive and retract a securing member 316 through a sealing member 318. In the exemplary represented by FIG. 5, the securing member 316 is a plurality of needles.

Figure 6:
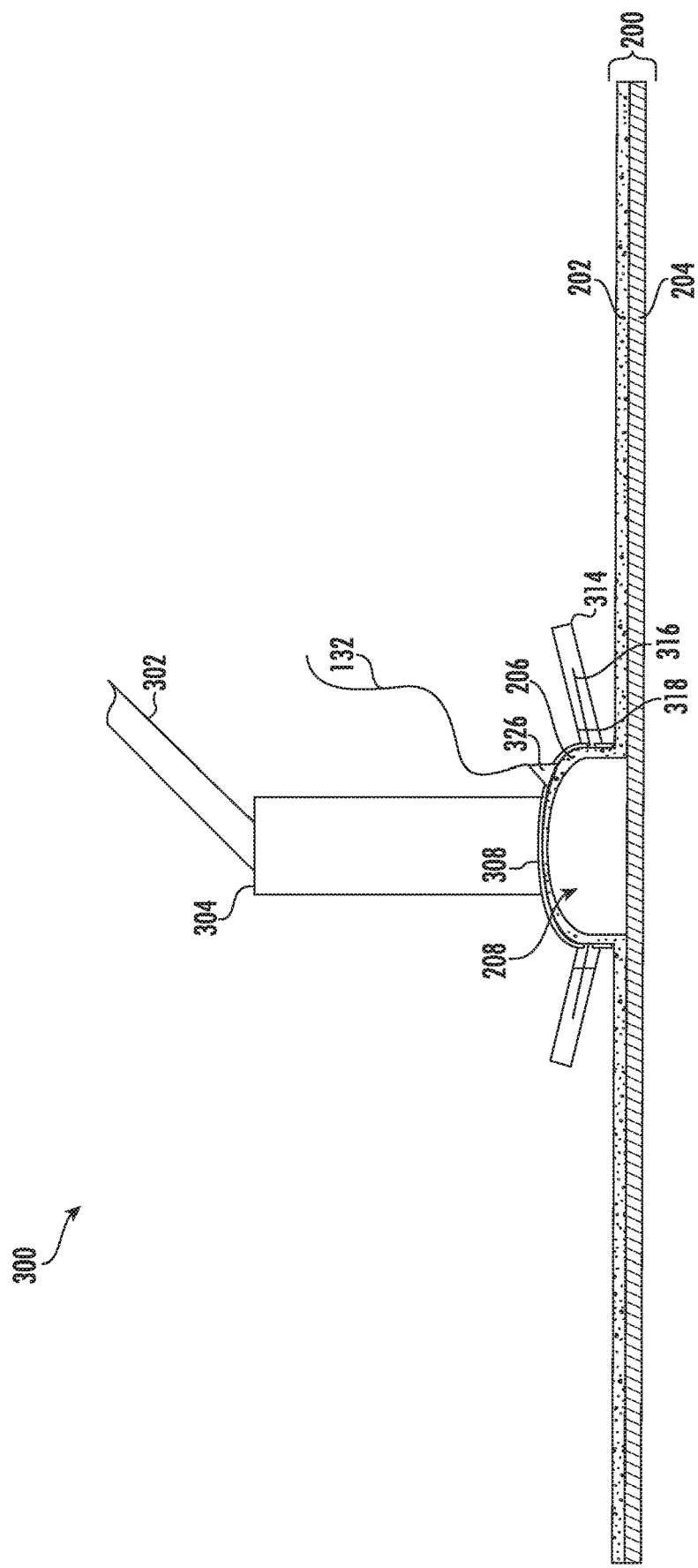
FIG. 6 shows the exemplary separating tool of FIG. 5 creating a void between a backing layer and a material layer.

FIG. 6 depicts the displaced portion 206 of the backing layer 202. The development of this displaced portion 206 results in the creation of a void 208 between the backing layer 202 and the material layer 204. Although, as discussed above, the displacement of the backing layer 202 may be accomplished through the establishment of a vacuum within the displacing member 308, additional structure (not shown) may be included in certain embodiments whereby the displacement results from the introduction of a compressed gas between the backing layer 202 and the material layer 204.

Figure 7:
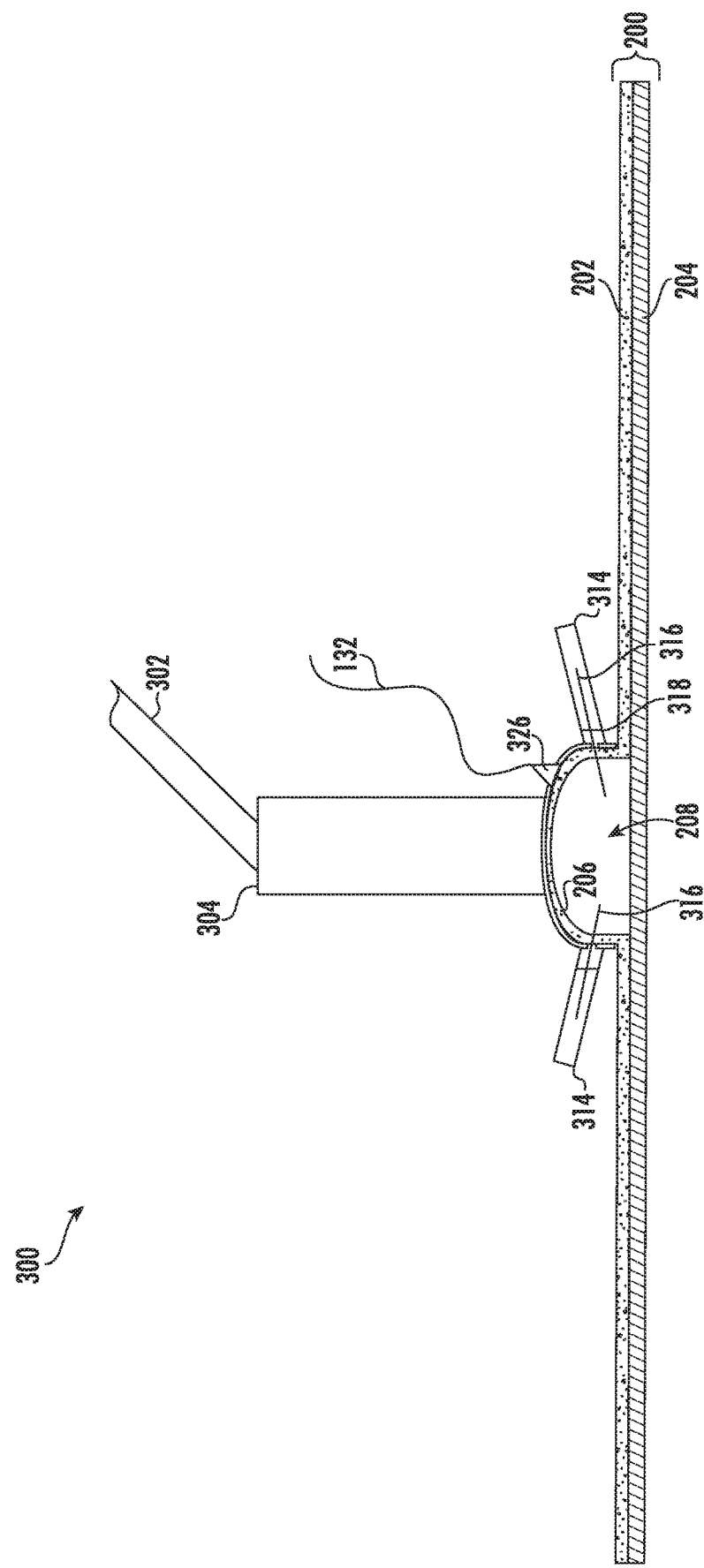
FIG. 7 shows the exemplary separating tool of FIG. 5 mechanically securing the backing layer.

FIG. 7 depicts an exemplary embodiment in which the plurality of actuators 314 have driven a plurality of securing members 316 through the displaced portion 206 of the backing layer 202 and into the void 208 between the backing layer 202 and the material layer 204. This action establishes a mechanical connection between the securing member 316 and the displaced portion 206 to couple the separating tool 300 to the backing layer 202. In the embodiment depicted by FIG. 7, the securing members 316 are at least one needle selected to ensure consistent penetration of the backing layer 202 without bending or breaking; for example, an embroidery needle. In other embodiments, the securing member 316 may be at least one lancet.

Figure 8:
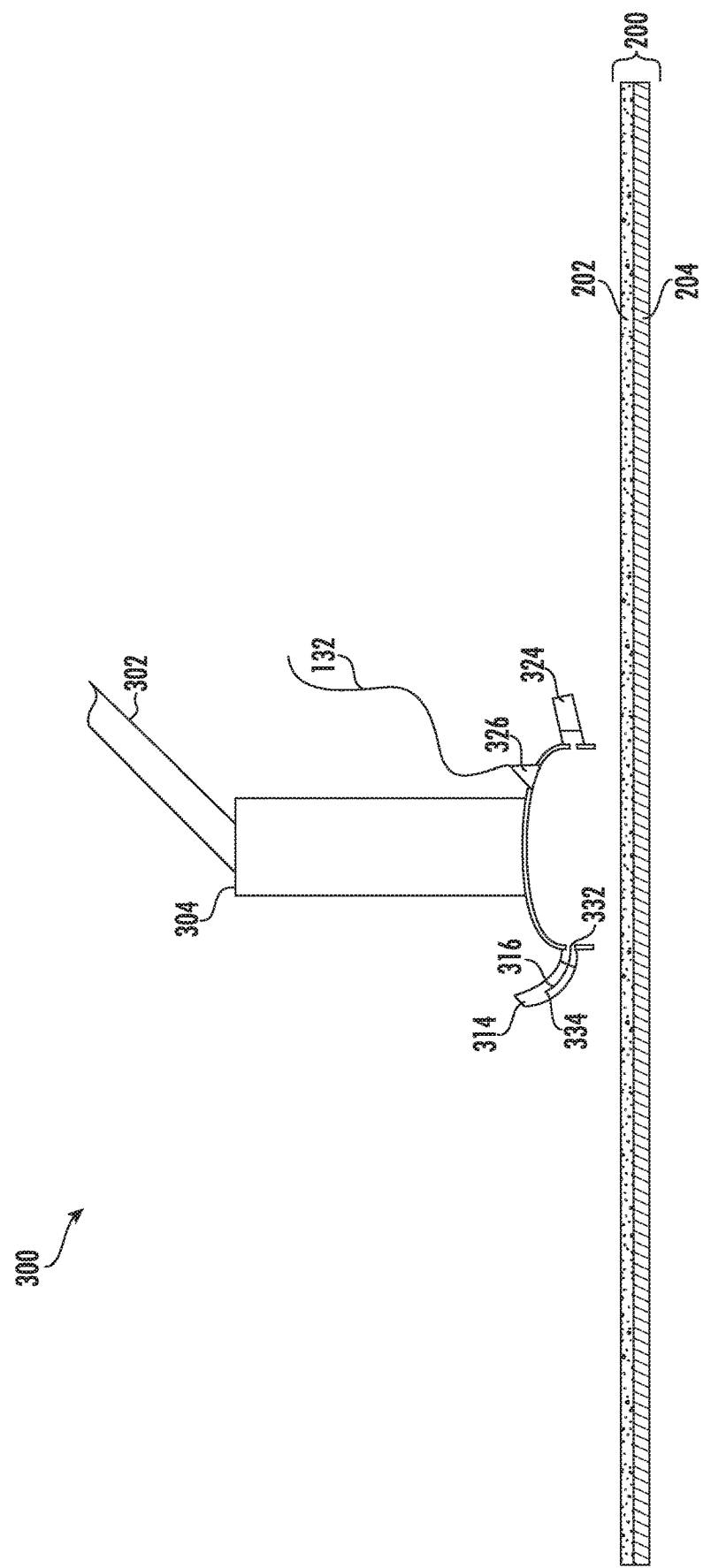
FIG. 8 shows a cross-section view of another exemplary of the separating tool such as for use in the system of FIGS. 1-4.

FIG. 8 depicts an alternative embodiment whereby the securing member 316 is a single, curved needle or hook having a first end and a second end opposite thereof. In this exemplary, a single actuator 314 drives a single securing member which passes through the displaced portion (not shown) of the backing layer 202 in two locations and enters a receiver port 324 coupled to the displacing member 308 at a point opposite the actuator 314. This action establishes a mechanical connection between the securing member 316 and the displaced portion (not shown).

Figure 9:
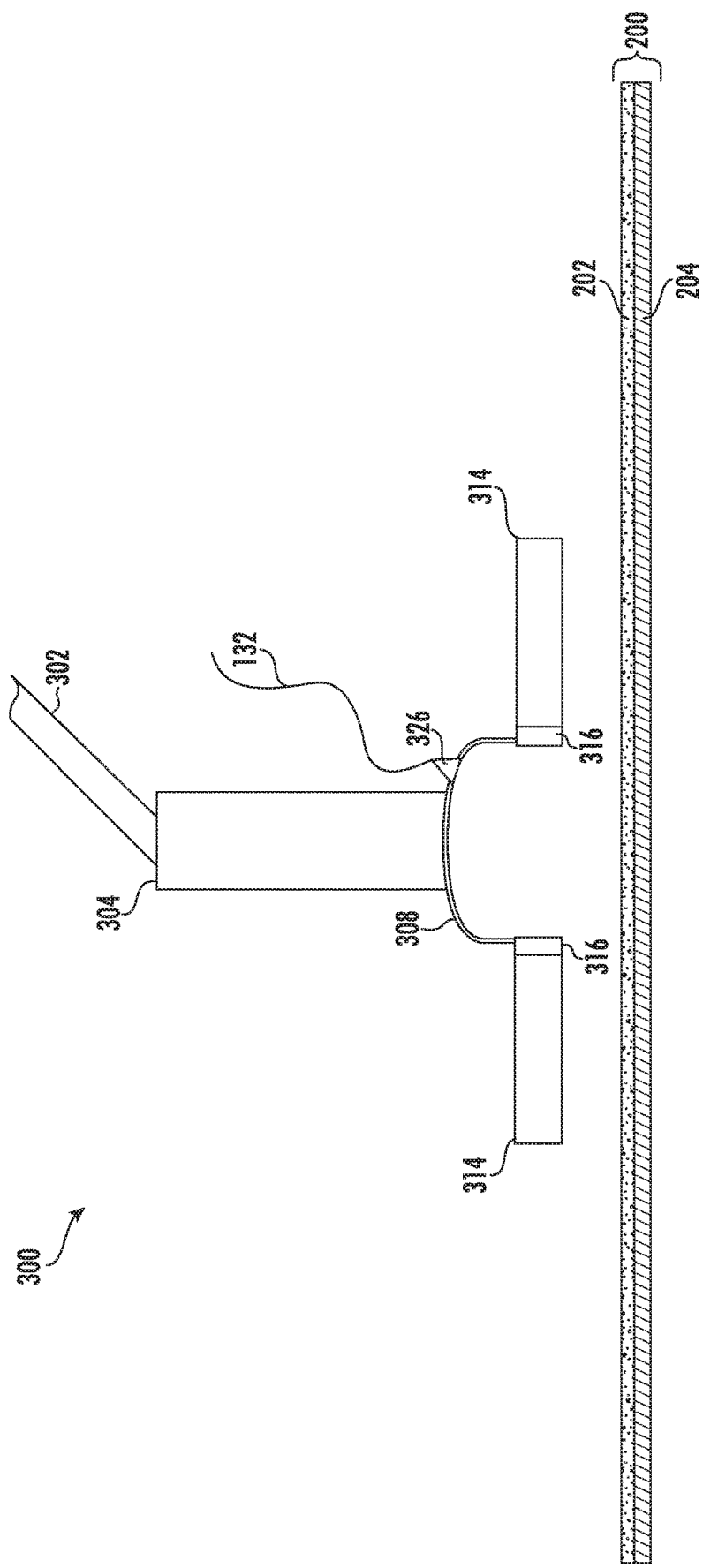
FIG. 9 shows a cross-section view of another exemplary of the separating tool such as for use in the system of FIGS. 1-4 which mechanically secures the backing layer without penetration.

FIG. 9 depicts an alternative embodiment of the present disclosure whereby the securing members 316 are a gripping element. In this instance, the securing members 316 do not penetrate the backing layer 202. Instead, the actuators 314 are coupled to the displacing member 308 at points separated by one hundred and eighty degrees. The opposing actuators 314 drive the securing members 316 toward each other, capturing a portion of the displaced portion (not shown) of the backing layer 202 in a pinch grip. This action establishes a mechanical connection between the securing members 316 and the displaced portion (not shown).

Figure 10:
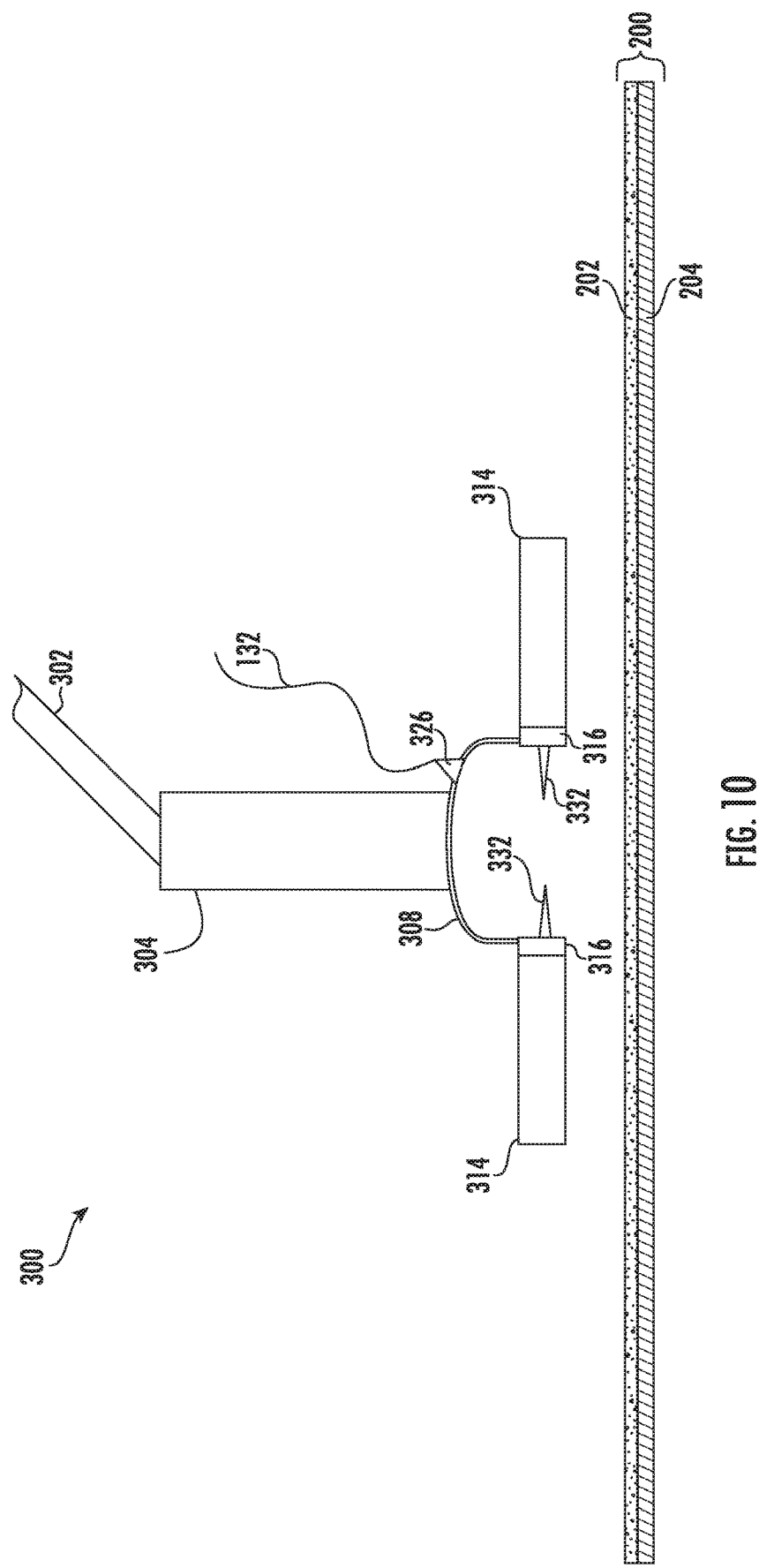
FIG. 10 shows a cross-section view of an exemplary separating tool such as for use in the exemplary systems of FIGS. 1-4.

FIG. 10 depicts an alternative embodiment of the present disclosure whereby the securing members 316 are a gripping element equipped with a piercing member 332. In this instance, the actuators 314 are coupled to the displacing member 308 at points separated by one hundred and eighty degrees. The opposing actuators 314 drive the securing members 316 toward each other, capturing a portion of the displaced portion (not shown) of the backing layer 202 in a pinch grip reinforced by the piercing member 332. This action establishes a mechanical connection between the securing members 316 and the displaced portion (not shown). It should be appreciated that the piercing member 332 may be any protrusion able to pierce the backing layer 202, such as a needle or lancet.

Figure 11:
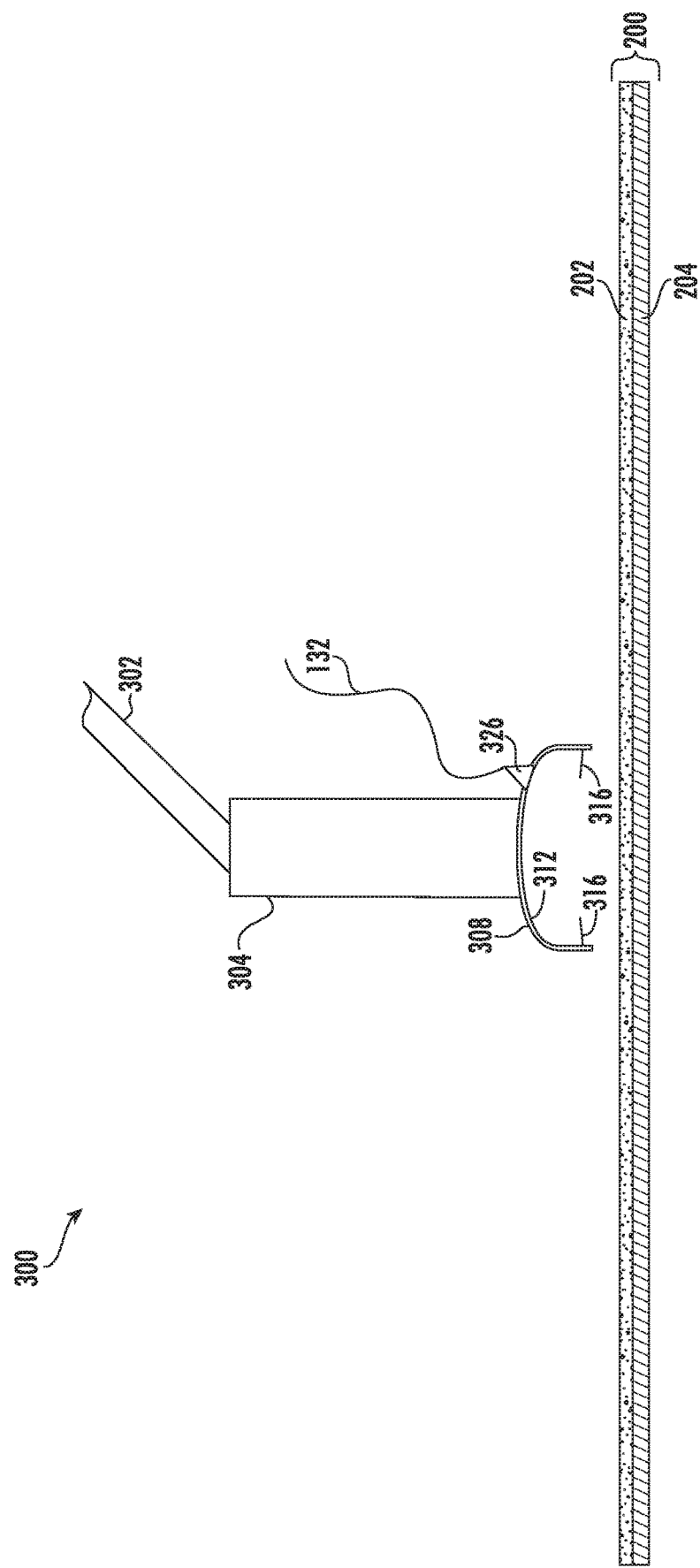
FIG. 11 shows a cross-section view of an exemplary separating tool such as for use in the exemplary systems of FIGS. 1-4 having a fixed securing member.

FIG. 11 depicts an alternative embodiment of the present disclosure whereby the securing members 316 are fixed. In this exemplary embodiment, a plurality of securing members 316 are coupled to inner face 312 of the displacing member 308. The displacement of a portion of the backing layer 202 causes the displaced portion (not shown) to be pierced by the securing members 316. It should be appreciated that the securing members 316 may be any protrusion able to pierce the backing layer 202, such as a needle or lancet.

Figure 12:
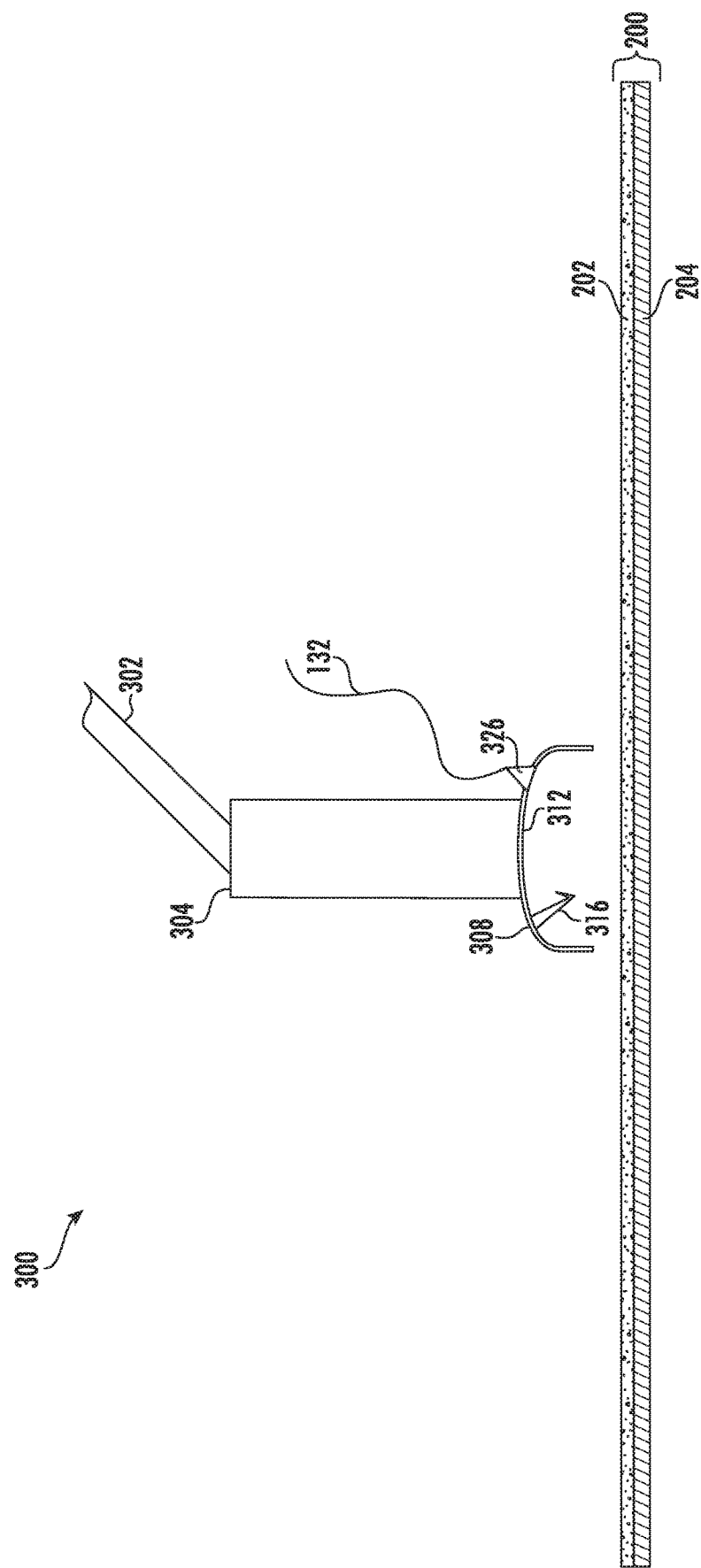
FIG. 12 shows a cross-section view of an exemplary separating tool such as for use in the exemplary systems of FIGS. 1-4 having a fixed securing member.

FIG. 12 depicts an alternative embodiment of the present disclosure whereby the securing member 316 is fixed. In this exemplary embodiment, the securing member 316 is a barbed member and is coupled to the inner face 312 of the displacing member 308. The displacement of a portion of the backing layer 202 causes the displaced portion (not shown) to be pierced by the securing members 316. It should be appreciated that the securing member 316 may be any barbed protrusion which is able to pierce the backing layer 202, such as a barbed needle or a barbed lancet.

Figure 13:
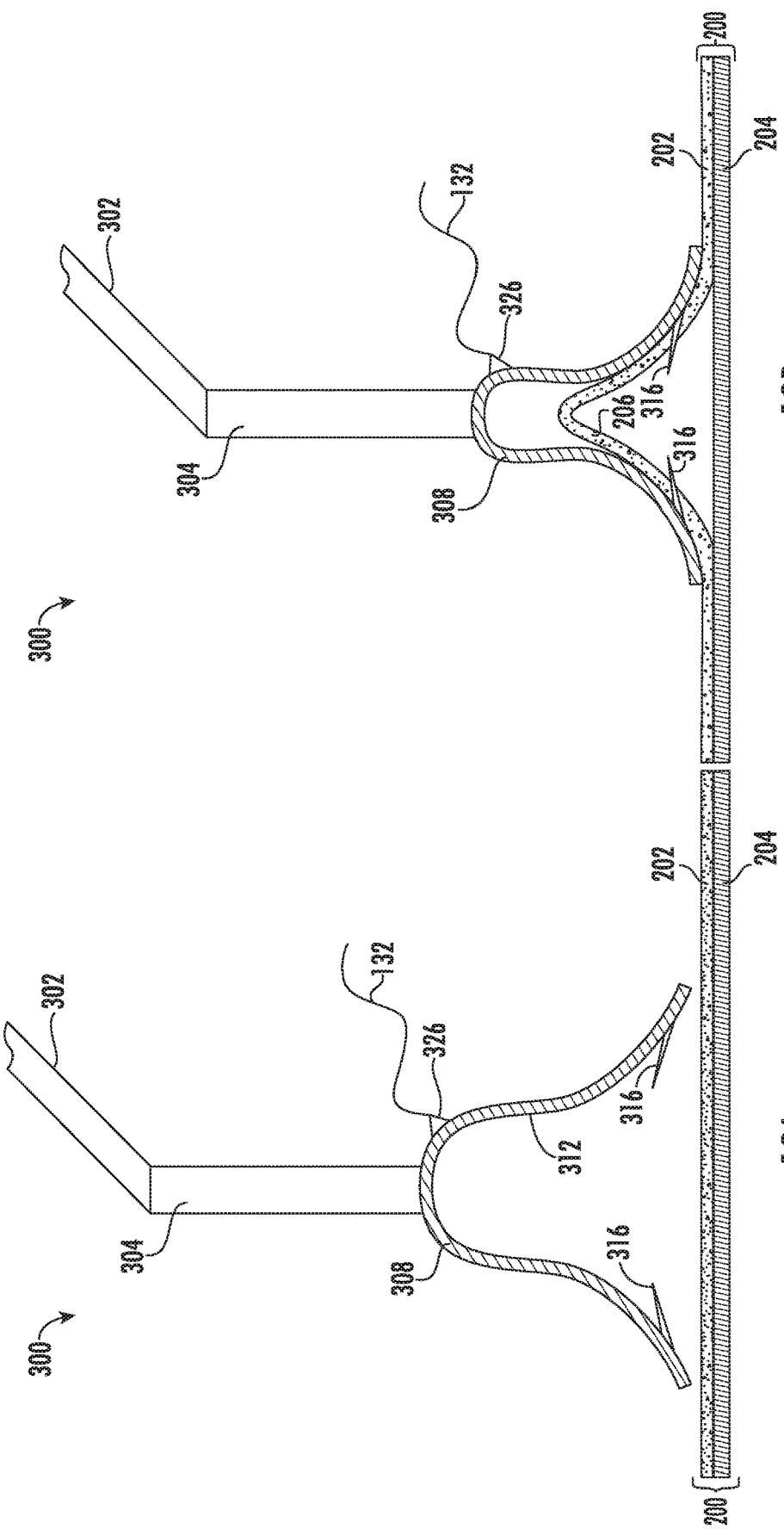
FIG. 13A and FIG. 13B show cross-sectional views of an exemplary separating tool such as for use in the exemplary systems of FIGS. 1-4 having a deformable displacing member and a fixed securing member.

FIG. 13A and FIG. 13B depict an alternative embodiment of the present disclosure wherein the displacing member 308 is deformable. In this exemplary embodiment, a plurality of securing members 316 are coupled to the inner face 312 of the displacing member 308. As a vacuum is drawn through an attached vacuum coupling 326, a portion of the backing layer 202 is displaced and the displacing member 308 is drawn towards the displaced portion 206. The deformation of the displacing member 308, as shown in FIG. 13B, causes the plurality of securing members 316 to pierce and mechanically secure the backing layer 202. It should be appreciated that the securing members 316 may be any protrusion able to pierce the backing layer 202, such as a needle or lancet.

Figure 14:
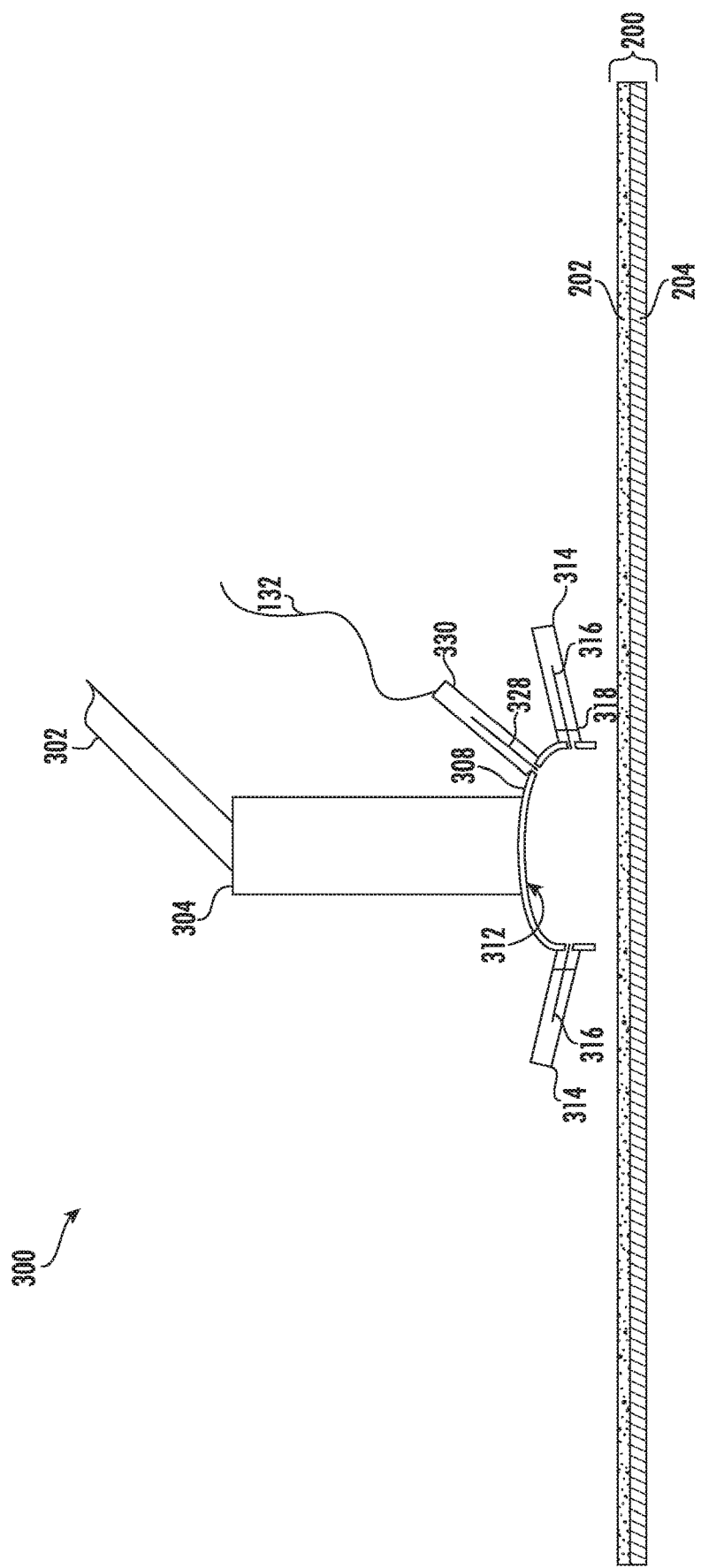
FIG. 14 shows a cross-section view of another exemplary of the separating tool such as for use in the system of FIGS. 1-4 which establishes a void with an inflation mechanism.

FIG. 14, depicts an alternative embodiment of the present disclosure whereby the displacement of the backing layer 202 occurs in response to the injection of gas between the backing layer 202 and the material layer 204 when a mating face 320 is in contact with the backing layer 202. In this alternative embodiment, a hollow needle 328 is inserted by an actuator 330 between the backing layer 202 and the material layer 204. Pressurized gas is delivered to the hollow needle 328 via a gas line 132, which is operably coupled to support structures 130. Pressurized gas is delivered by the hollow needle 328 between the backing layer 202 and the material layer 204 to displace a sufficient portion of the backing layer so as to enable mechanical securing of the displaced portion. In some embodiments, it may be desirable to ensure a sufficient portion of the backing layer 202 is displaced to enable mechanical securing without the securing mechanism penetrating the material layer 204.

Figure 17:
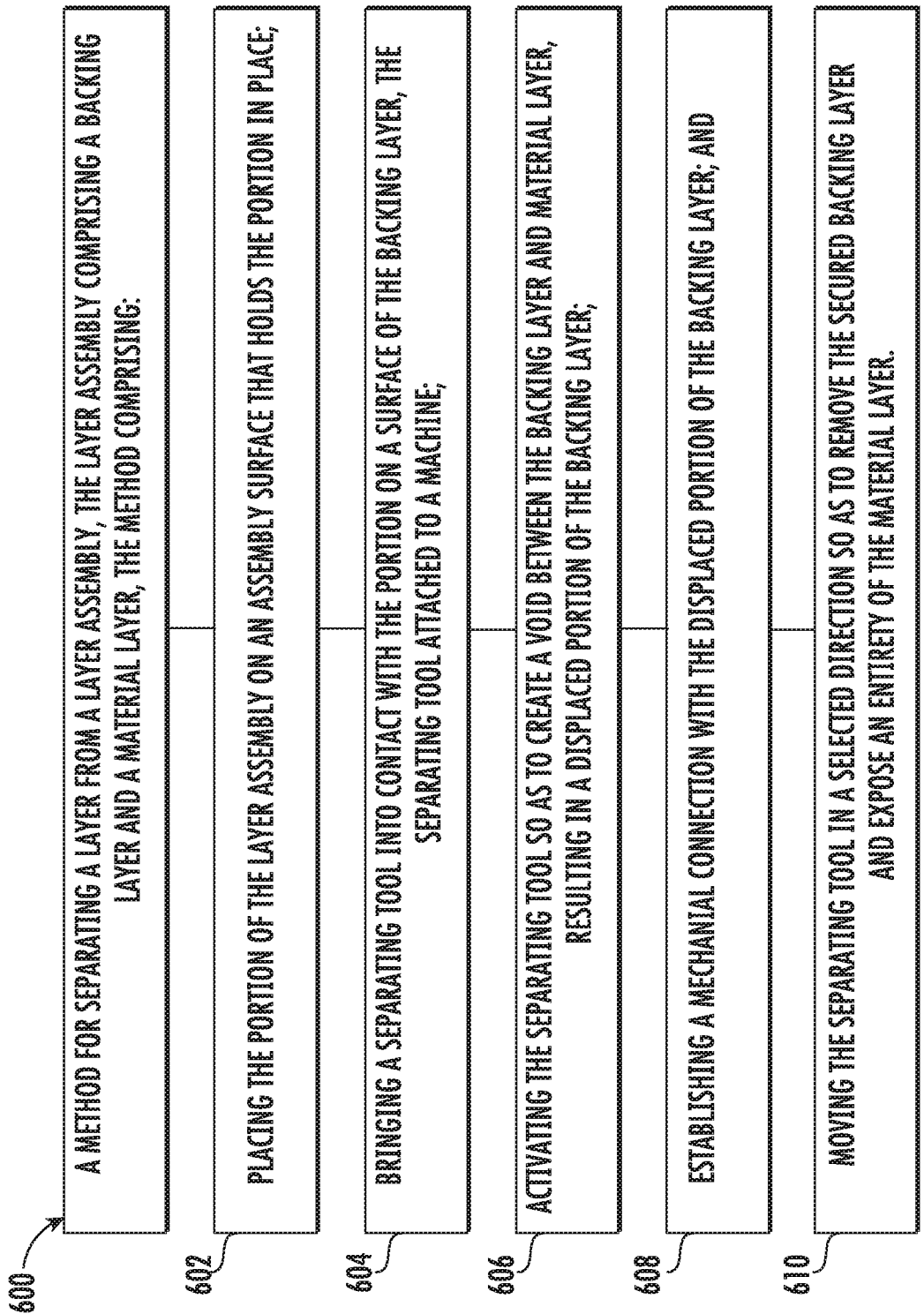
FIG. 17 provides a flow diagram for separating a layer from a layer assembly according to an exemplary embodiment of the present disclosure.

Referring now to FIG. 17, this figure is a flow diagram of a method (600) for separating a layer from a layer assembly or layer stack, the layer assembly includes a backing layer and a material layer. The exemplary method (600) includes at (602) placing the portion of the layer assembly on an assembly surface that holds the portion in place and at (604), bringing a separating tool into contact with the portion on a surface of the backing layer, the separating tool attached to a machine. The exemplary method (600) includes at (606) activating the separating tool so as to create a void between the backing layer and material layer, resulting in a displaced portion of the backing layer, and at (608) establishing a mechanical connection with the displaced portion of the backing layer. Additionally, the exemplary method (600) includes at (610) moving the separating tool in a selected direction so as to remove the secured backing layer and expose an entirety of the material layer.

Figure 18:
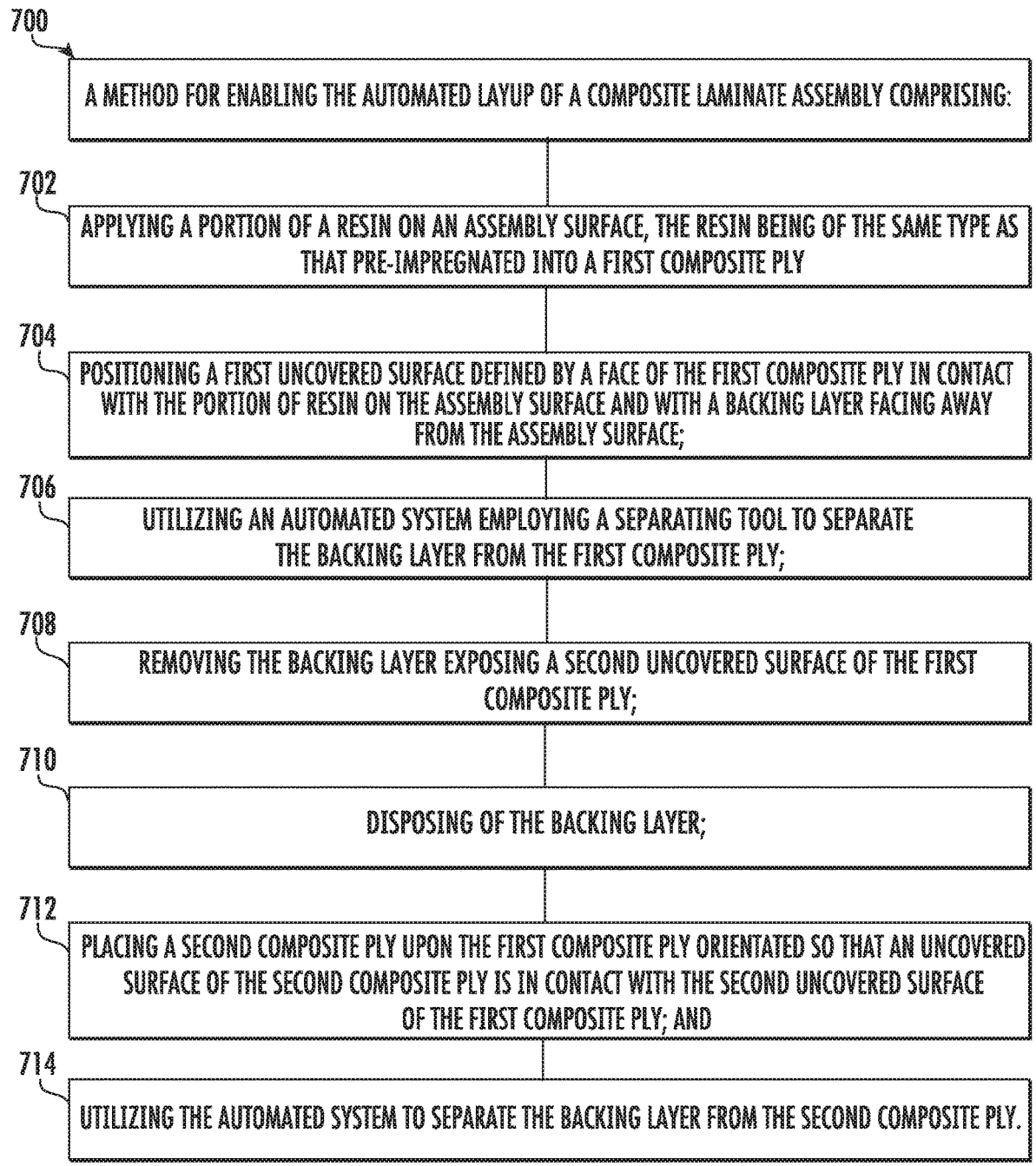
FIG. 18 provides a flow diagram for enabling the automated layup of a composite laminate assembly according to an exemplary embodiment of the present disclosure.

Referring now to FIG. 18, a flow diagram of a method (700) for enabling the automated layup of a composite laminate assembly is presented. The exemplary method (700) includes at 70b2 applying a portion of a resin on an assembly surface, the resin being of the same type as that pre-impregnated into a first composite ply and at (704) positioning a first uncovered surface defined by a face of the first composite ply in contact with the portion of resin on the assembly surface and with a backing layer facing away from the assembly surface. The exemplary method (700) includes at (706) utilizing an automated system employing a separating tool to separate the backing layer from the first composite ply, at (708) removing the backing layer exposing a second uncovered surface of the first composite ply, and at (710) disposing of the backing layer. Additionally, the exemplary method (700) includes at (712) placing a second composite ply upon the first composite ply orientated so that an uncovered surface of the second composite ply is in contact with the second uncovered surface of the first composite ply, and at (714) utilizing the automated system to separate the backing layer from the second composite ply. Additional material layers may be added until the desired number of composite plies have been achieved.

Referring again to FIG. 1, in the embodiment shown, the automated machine 100 is an articulated robotic arm assembly. The exemplary robotic arm assembly depicted generally includes a base 114, a robotic arm 116, and the moveable component 106. The base 114 generally includes an actuator pack 118 and the controller 102. The controller 102 is operably coupled to the actuator pack 118 for controlling operation of the automated machine 100. Additionally, the controller 102 may be operably coupled to the moveable component 106 and/or one or more sensors (not shown) attached to or embedded in the robotic arm 116 and/or moveable component 106. Further, the robotic arm 116 extends generally between a root end 120 and a distal end 124. As will be explained in greater detail below, the robotic arm 116 includes an attachment section 122 at the root end 120, with the attachment section 122, for the embodiment depicted, attached to the actuator pack 118 of the base 114. Additionally, the robotic arm 116 includes the end effector 104 coupled to the moveable component 106 at a distal end 124.

Moreover, the robotic arm 116 of the exemplary automated machine 100 depicted is generally formed of a plurality of links 126 and a plurality of joints 128, with the plurality of links 126 sequentially arranged and movably coupled to one another with the plurality of joints 128. At least certain of the plurality of links 126 are operable with the actuator pack 118, such that one or more actuators or motors (not shown) of the actuator pack 118 may control operation (such as a position and/or orientation) of the robotic arm 116. However, in other embodiments, any other suitable configuration may be provided for manipulating or otherwise controlling the plurality of links 126 of the robotic arm 116 of the exemplary automated machine 100.

Further, as is depicted, the base 114 includes one or more support structures 130 operable with the end effector 104 for assisting the end effector 104 and performing certain operations. For example, when the end effector 104 is configured as a welder, the one or more support structures 130 may include, e.g., a gas supply, a wire supply, an electric power supply, etc. When the end effector 104 is configured as an astrictive gripper employing vacuum, the one or more support structures 130 may include, a vacuum pump coupled to vacuum lines 132.

In further embodiments, the automated machine 100 may be any other suitable form of automated machine. For example, the automated machine 100 may be a cartesian robot, a scara robot, a cylindrical robot, a polar robot, or a delta robot.

In some instances, the material layer 204 may be a ceramic matrix composite (CMC) material. CMC materials are more frequently being used for various high temperature applications. For example, because CMC materials can withstand relatively extreme temperatures, there is particular interest in replacing components within a combustion gas flow path of a gas turbine engine with components made from CMC materials. Typically, CMC materials comprise ceramic fibers embedded in a matrix material such as silicon carbide (SiC), silicon, silica, alumina, or combinations thereof. Plies of the CMC material may be laid up to form a preform component that may then undergo thermal processing, such as a cure or burn-out to yield a high char residue in the preform, and subsequent chemical processing, such as melt-infiltration with silicon, to arrive at a component formed of a CMC material having a desired chemical composition.

Figure 16:
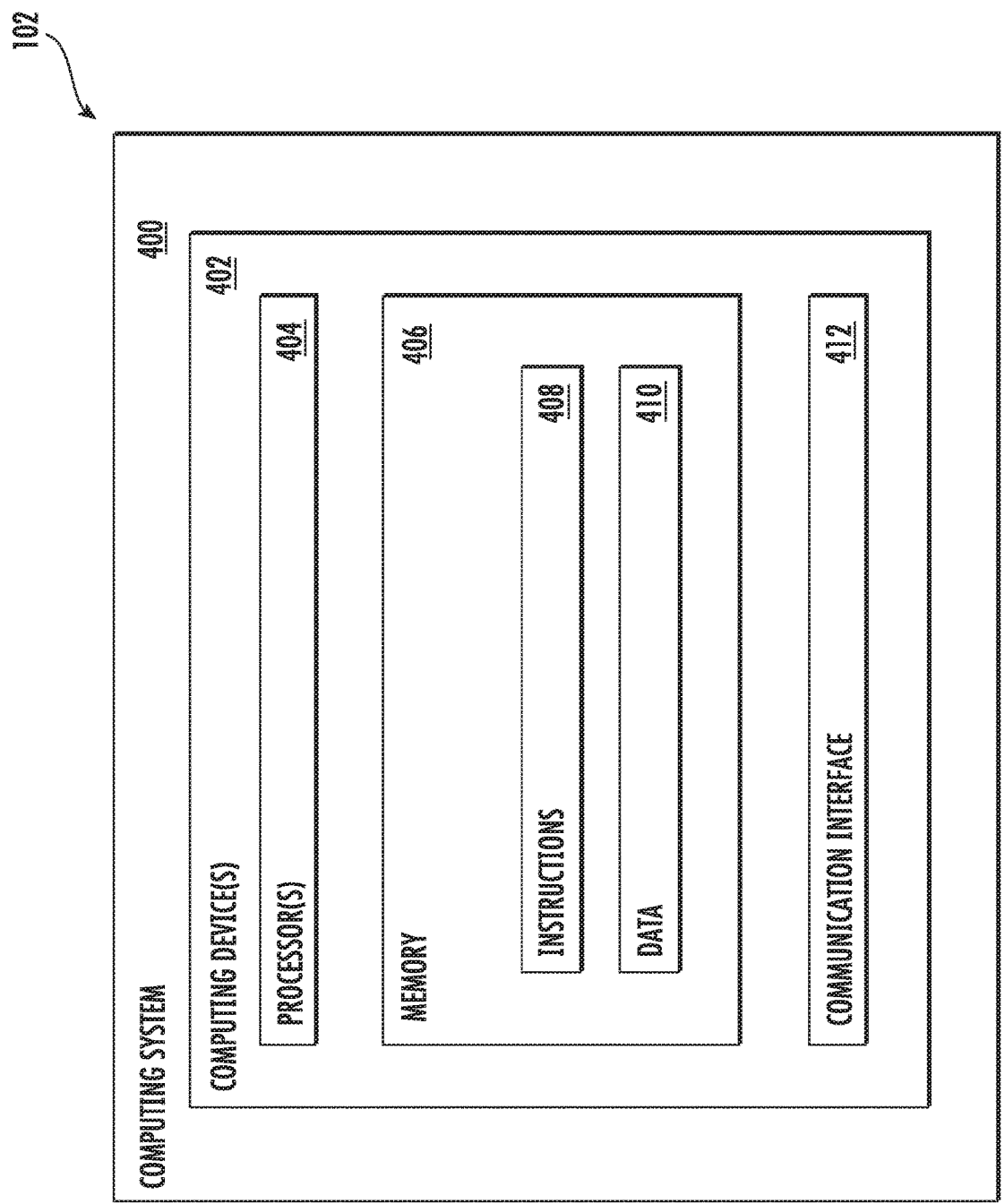
FIG. 16 depicts an exemplary controller such as for use in the exemplary systems of FIGS. 1-4.

FIG. 16 provides a block diagram of an example computing system 400 that is representative of controller 102 that may be used to implement the methods and systems described herein according to exemplary embodiments of the present disclosure. As shown, the computing system 400 may include one or more computing device(s) 402. The one or more computing device(s) 402 may include one or more processor(s) 404 and one or more memory device(s) 406. The one or more processor(s) 404 may include any suitable processing device, such as a microprocessor, microcontroller, integrated circuit, logic device, or other suitable processing device. The one or more memory device(s) 406 may include one or more computer-readable media, including, but not limited to, non-transitory computer-readable media, RAM, ROM, hard drives, flash drives, or other memory devices.

The one or more memory device(s) 406 may store information accessible by the one or more processor(s) 404, including computer-readable instructions 408 that may be executed by the one or more processor(s) 404. The instructions 408 may be any set of instructions that when executed by the one or more processor(s) 404, cause the one or more processor(s) 404 to perform operations. The instructions 408 may be software written in any suitable programming language or may be implemented in hardware. In some embodiments, the instructions 408 may be executed by the one or more processor(s) 404 to cause the one or more processor(s) 404 to perform operations, such as implementing one or more of the processes mentioned above.

The memory device(s) 404 may further store data 410 that may be accessed by the processor(s) 404. For example, the data 410 may include a third instance of shared data for a gas turbine engine, as described herein. The data 410 may include one or more table(s), function(s), algorithm(s), model(s), equation(s), etc. according to example embodiments of the present disclosure.

The one or more computing device(s) 402 may also include a communication interface 412 used to communicate, for example, with the other components of system. The communication interface 412 may include any suitable components for interfacing with one or more network(s), including for example, transmitters, receivers, ports, controllers, antennas, or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein may be implemented using a single computing device or multiple computing devices working in combination. Databases, memory, instructions, and applications may be implemented on a single system or distributed across multiple systems. Distributed components may operate sequentially or in parallel.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An automated system for separating a layer from a layer assembly, the layer assembly comprising a backing layer and a material layer, the automated system comprising:
   an automated machine having a controller and an end effector; and
   a separating tool attached to the end effector of the automated machine, the separating tool including,
      a displacing member configured to establish a void between the backing layer and the material layer by displacing a portion of the backing layer, the displacing member further comprising a displacing member outer face, and
      a securing member configured to establish a mechanical connection with a displaced portion of the backing layer,
   wherein the end effector comprises a vacuum roller configured to lift at least a portion of the layer assembly.

2. The automated system of claim 1, wherein the separating tool further comprises an actuator coupled to the displacing member outer face and wherein the securing member is a plurality of needles, and wherein the actuator is configured to drive and retract the plurality of needles through a sealing member, penetrating the displaced portion of the backing layer.

3. The automated system of claim 1, wherein the separating tool further comprises an actuator coupled to the displacing member outer face and wherein the securing member is a lancet, and wherein the actuator is configured to drive and retract the lancet through a sealing member, penetrating the displaced portion of the backing layer.

4. The automated system of claim 1, wherein the separating tool further comprises:
an actuator coupled to the displacing member outer face;
a sealing member;
a receiver port coupled to the displacing member outer face; and
wherein the securing member is a needle having a first end portion and a second end portion opposite thereof, and wherein the actuator configured to drive and retract the needle so as to drive the first end portion of the needle through the sealing member, passing through the displaced portion of the backing layer, and entering the receiver port, while retaining the second end portion.

5. The automated system of claim 1, wherein the separating tool further comprises a plurality of actuators coupled to the displacing member outer face and the securing member is a plurality of gripping elements, and wherein the plurality of actuators are configured to drive and retract the plurality of gripping elements so as to grip a displaced portion of the backing layer between opposing gripping elements.

6. The automated system of claim 5, wherein the separating tool further comprises:
a piercing member coupled to at least one of the plurality of gripping elements.

7. The automated system of claim 1, wherein the separating tool further comprises a vacuum coupling coupled to the displacing member, and wherein the vacuum coupling is operably coupled to a vacuum line.

8. The automated system of claim 1, wherein the separating tool further comprises:
an actuator coupled to the displacing member outer face;
a hollow needle; and
a gas line communicably coupled to the hollow needle, and wherein the actuator is configured to insert a portion of the hollow needle between the backing layer and the material layer.

9. The automated system of claim 1 further comprising an assembly surface configured with a securing substrate.

10. The automated system of claim 9, wherein the securing member is a barbed protrusion.

11. The automated system of claim 1, wherein the displacing member further comprises an inner face and wherein the securing member is fixedly coupled to the inner face.

12. The automated system of claim 1, wherein the displacing member further comprises an inner face, wherein the displacing member is deformable in response to a vacuum, and wherein the securing member is fixedly coupled to the inner face.

* * * * *